US012798656B2

(12) United States Patent
Vendrand

(10) Patent No.: US 12,798,656 B2
(45) Date of Patent: Nov. 17, 2026

(54) VEHICLE STEERING WHEEL WITH AN ELECTRICAL DEVICE

(71) Applicant: AUTOLIV DEVELOPMENT AB, Vargarda (SE)

(72) Inventor: Victorien Vendrand, Poitiers (FR)

(73) Assignee: Autoliv Development AB, Vårgårda (SE)

( * ) Notice: Subject to any disclaimer, the term of this patent is extended or adjusted under 35 U.S.C. 154(b) by 133 days.

(21) Appl. No.: 18/833,734

(22) PCT Filed: Jan. 26, 2023

(86) PCT No.: PCT/EP2023/051868

§ 371 (c)(1),
(2) Date: Mar. 24, 2025

(87) PCT Pub. No.: WO2023/144242

PCT Pub. Date: Aug. 3, 2023

(65) Prior Publication Data

US 2025/0229823 A1 Jul. 17, 2025

(30) Foreign Application Priority Data

Jan. 31, 2022 (FR) .................................. FR2200844

(51) Int. Cl.
*B62D 1/04* (2006.01)
*B32B 5/02* (2006.01)
(Continued)

(52) U.S. Cl.
CPC .............. *B62D 1/046* (2013.01); *B32B 5/022* (2013.01); *B32B 5/024* (2013.01); *B32B 5/18* (2013.01);
(Continued)

(58) Field of Classification Search
CPC ........ B62D 1/046; B62D 1/106; B62D 1/065; B62D 1/10; B32B 5/022
See application file for complete search history.

(56) References Cited

U.S. PATENT DOCUMENTS 4,323,607 A * 4/1982 Nishimura ........ B29C 66/73715 156/84
6,365,875 B1 * 4/2002 Kreuzer ................. B62D 1/065 74/552
(Continued)

FOREIGN PATENT DOCUMENTS

DE 112020000108 T5 10/2021
WO 2010028155 A2 3/2010
WO WO-2017026217 A1 * 2/2017 ............. B62D 1/065

OTHER PUBLICATIONS

Machine translation of WO2017026217 A1, obtained from FIT database (Year: 2017).*

*Primary Examiner* — Thomas C Diaz
(74) *Attorney, Agent, or Firm* — Matthew D. Thayne; Thayne and Davis LLC

(57) ABSTRACT

A vehicle steering wheel, comprising: a hub arranged to be connected to a steering element of the vehicle, at least one branch attached to the hub, a rim attached to said at least one branch, comprising: at least one electrical device covering at least part of a core of the rim and comprising a substrate supporting at least one electrical conductor, at least one trim piece, such as an outer sheath, defining an outer surface of the rim, at least one layer of water-based glue arranged to attach the trim piece to the rim, wherein the rim comprises at least one film comprising a polymer, arranged between the electrical device and the layer of water-based adhesive.

15 Claims, 2 Drawing Sheets

(51) Int. Cl.

| | |
|---|---|
| ***B32B 5/18*** | (2006.01) |
| ***B32B 7/12*** | (2006.01) |
| ***B32B 27/06*** | (2006.01) |
| ***B32B 27/12*** | (2006.01) |
| ***B62D 1/06*** | (2006.01) |
| ***B62D 1/10*** | (2006.01) |

(52) U.S. Cl.

CPC .............. *B32B 7/12* (2013.01); *B32B 27/065* (2013.01); *B32B 27/12* (2013.01); *B62D 1/06* (2013.01); *B62D 1/10* (2013.01); *B32B 2307/72* (2013.01); *B32B 2307/7376* (2023.05); *B32B 2605/003* (2013.01)

(56) References Cited

U.S. PATENT DOCUMENTS

| | | | | |
|---|---|---|---|---|
| 6,392,195 | B1 * | 5/2002 | Zhao | B62D 1/065 219/204 |
| 6,495,799 | B1 * | 12/2002 | Pillsbury, IV | B62D 1/065 219/204 |
| 6,838,647 | B2 * | 1/2005 | Nagele | H05B 3/34 219/205 |
| 7,329,835 | B2 * | 2/2008 | Hilmer | B62D 1/065 219/202 |
| 9,045,158 | B2 * | 6/2015 | Letzas | H05B 3/34 |
| 9,810,727 | B2 * | 11/2017 | Kandler | B62D 1/046 |
| 11,850,835 | B2 * | 12/2023 | Simpson | B32B 27/065 |
| 2011/0233183 | A1 | 9/2011 | Saunders et al. | |
| 2015/0367875 | A1 * | 12/2015 | Nonoyama | B62D 1/065 219/204 |
| 2022/0212711 | A1 | 7/2022 | Zhang et al. | |

* cited by examiner

[Fig. 1]
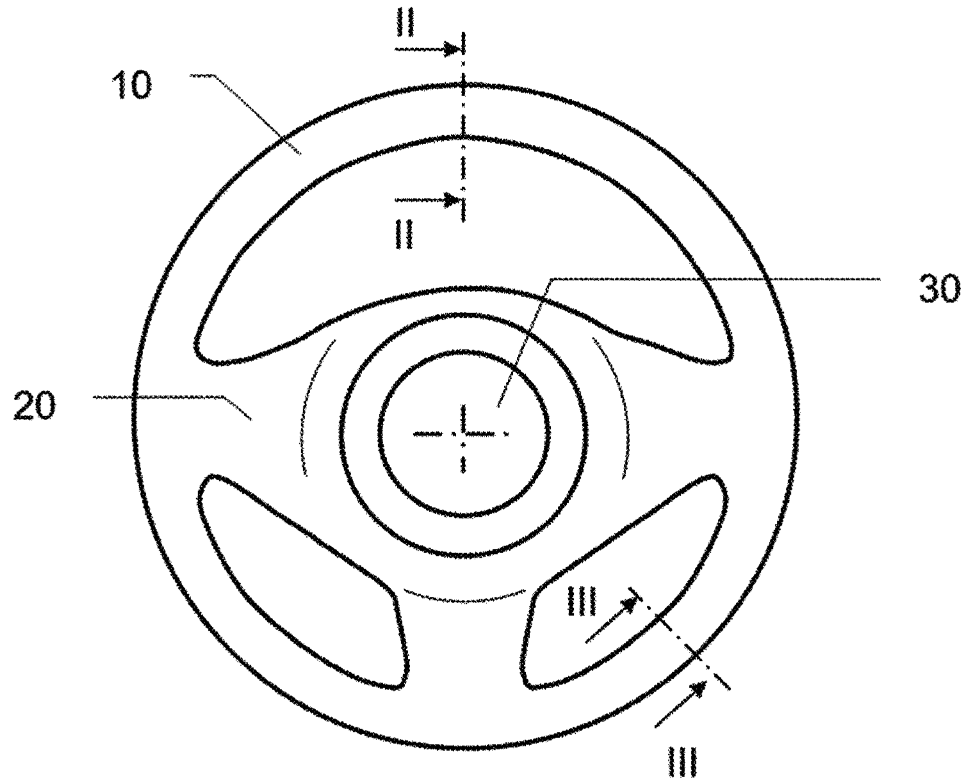
[Fig. 2]
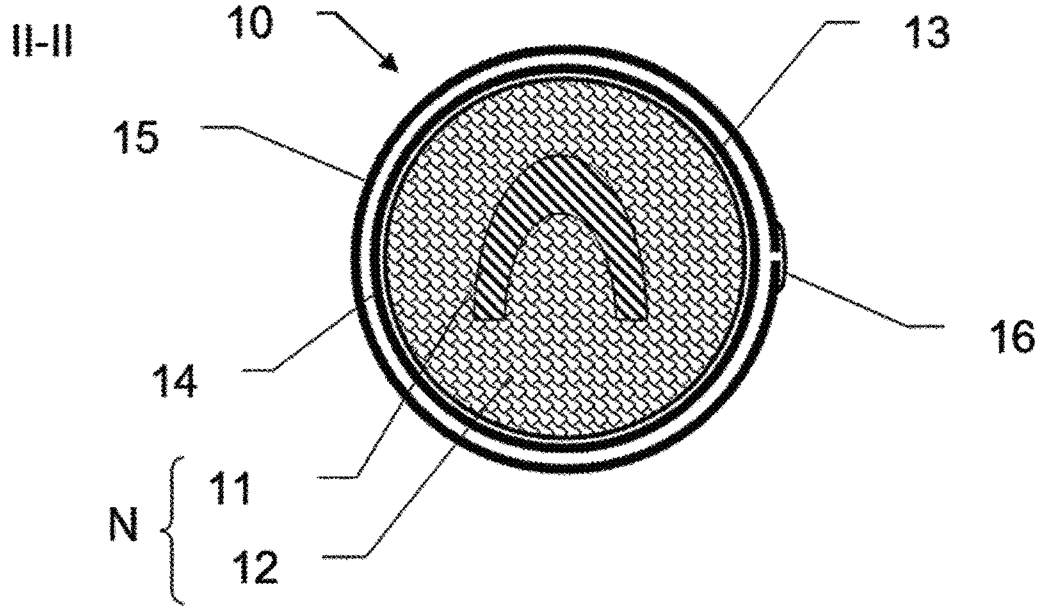

[Fig. 3]
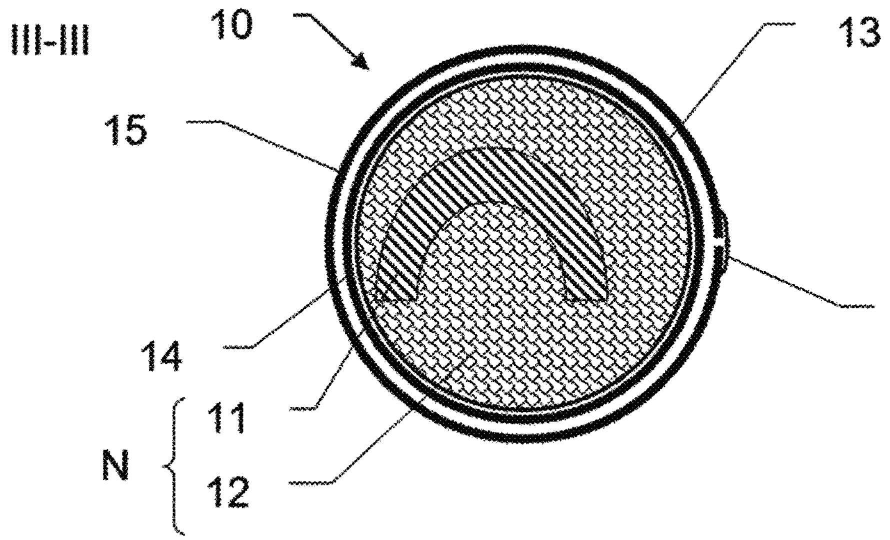
[Fig. 4]
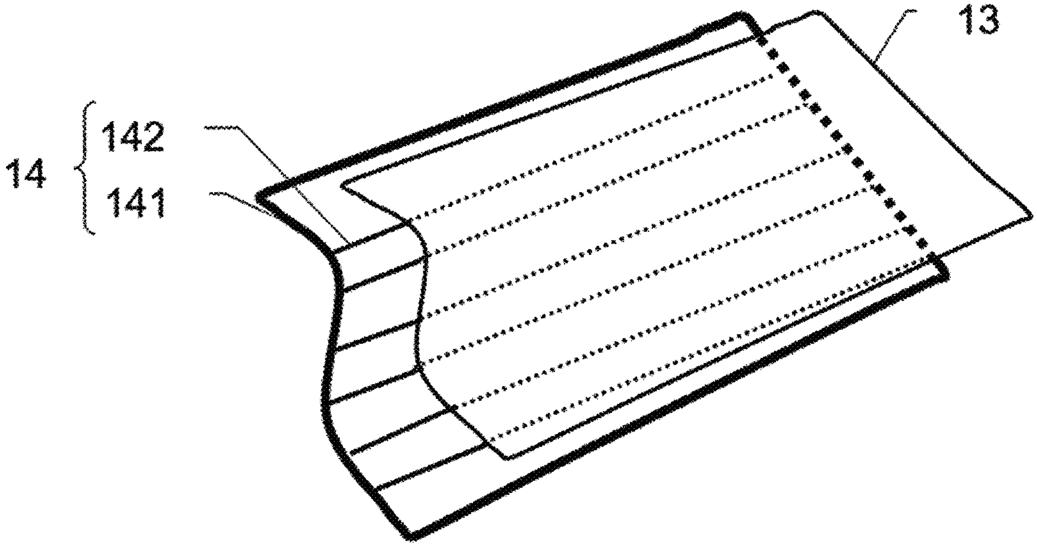

VEHICLE STEERING WHEEL WITH AN ELECTRICAL DEVICE

TECHNICAL FIELD OF THE INVENTION

The present invention relates in general to vehicle steering wheels, and in particular vehicle steering wheels equipped with an electrical device (such as a device for heating or detecting contact or proximity with the user), in particular at the rim.

STATE OF THE ART

In the prior art, vehicle steering wheels equipped with an electrical device (such as a device for heating or detecting contact or proximity with the user), in particular at the rim, it is known to position the electrical device on a core of the rim. The core typically consists of a frame overmolded with an overmolding material. The electrical device in turn comprises an electrical conductor carried by a flexible substrate. A trim piece (typically an outer sheath) and/or the electrical device can be attached to one another or can each be attached to the rim with a glue, and in particular an aqueous or water-based glue. The glue may diffuse into the flexible substrate and/or onto the electrical conductor, which may result in bonding and/or electrical faults (short-circuiting a heating circuit, altering the capacitive characteristics of a contact or proximity sensor, etc.)

DISCLOSURE OF THE INVENTION

One aim of the present invention is to overcome the above-mentioned drawbacks of the prior art and, in particular, first of all, to propose a vehicle steering wheel equipped with an electrical device whose operation is not disturbed even if the frame is close to the electrical device and/or even if the attachment of the electrical device to the steering wheel involves steering wheel assembly methods with, for example, drying or cross-linking reactions which still occur during testing phases.

For this a first aspect of the invention therefore relates to a vehicle steering wheel, comprising:

- a hub arranged to be connected to a steering element of the vehicle,
- at least one branch attached to the hub,
- a rim attached to said at least one branch, comprising:
- at least one electrical device covering at least part of a core of the rim and comprising a substrate supporting at least one electrical conductor,
- at least one trim piece, such as an outer sheath, defining an outer surface of the rim,
- at least one layer of glue, preferably water-based, arranged to attach the trim piece to the rim, characterized in that the rim comprises at least one film comprising a polymer, arranged between the electrical device and the layer of glue, preferably water-based.

According to the above embodiment, the steering wheel comprises a glue layer which can be any kind of glue, but is preferably a water-based glue, and a film comprising a polymer is provided between the (water-based) glue layer and the electrical device. This prevents any liquid or water migration from the glue to the electrical device, particularly immediately after gluing, that is, during manufacture of the steering wheel. In fact, it has been found that without the film, electrical faults can occur during or just after manufacture, and may or may not disappear a few hours or tens of hours (e.g. 72 hours) after manufacture. Implanting the film eliminates these defects. What is more, the film prevents any migration of the water-based glue into porous or absorbent substrates, reducing the risk of delamination or bonding defects.

In particular, the layer of glue can be a layer of glue which is applied (spread, sprayed, coated, etc.) to the steering wheel in paste or liquid form to attach the trim piece. In other words, the layer of water-based glue is not the adhesive layer that is applied to a flexible substrate to form an adhesive tape that is supplied, for example, on a reel or roll and then unwound. The layer of water-based glue is not part of a double-sided adhesive tape. In particular, the layer of glue can be a layer of glue that needs to dry or crosslink after the trim piece has been attached. The film containing a polymer thus forms a barrier between the electrical device and the water-based glue (and its water), enabling the steering wheel to undergo insulation tests before the layer of glue has completely dried (or cured). A water-based glue is simply a glue containing water, to be applied to the polymer film and/or trim piece. It is a stand-alone component, and in particular is not provided on any substrate to be affixed to the rim, as would be the case with adhesive tape.

In other words, the film forms a barrier to the moisture contained in the water-based glue and reduces defects that could occur in steering wheels without a protective film next to or adjacent to the electrical device.

Generally, the glue is a liquid or pasty glue, and/or a glue with at least one liquid part which evaporates during a drying step. According to one embodiment, the glue is an aqueous-based glue. According to an alternative, the glue is a solvent-based glue, or an adhesive with a solvent or organic solvent. In other words, during the application of the glue, a liquid part (water or organic solvent) of the glue can migrate into porous materials, and/or disrupt the operation of the electrical device. The film comprising a polymer serves as a barrier impermeable to the liquid part to prevent it from migrating into porous materials, and/or to disturb the operation of the electrical device.

According to one embodiment, the water-based glue (liquid or paste) is applied directly to the film comprising a polymer (itself applied to the electrical device), and/or to parts of the steering wheel (typically the trim piece) attached to the electrical device (protected by the polymer film).

According to one embodiment, the electrical device may comprise a single substrate supporting said at least one electrical conductor.

According to one embodiment, the electrically insulating film can form an independent component as such. In other words, the electrically insulating film can be an envelope or a barrier or else a film separating the electrical conductor from the core, formed by an independent sheet (before assembly on the core). In particular, the electrically insulating film may form a component free of adhesive layer. In particular, the insulating film is not a layer of glue spread on the core and/or on the electrical device (or inside the electrical device). An electrically insulating film is naturally thin (with a thickness of less than 0.2 mm, between 0.01 mm and 0.05 mm) and makes it possible to propose two distinct layers of overmolding material, without however imposing a large diameter of the rim.

According to one embodiment, the substrate is not a film. According to one embodiment, the substrate is a porous support and/or having through openings (such as openings between threads of a woven or nonwoven textile, openings of an open-cell foam). Such openings cannot prevent contact between the electrical conductor and the core, so that the electrically insulating film guarantees good electrical insulation.

According to one embodiment, the substrate may be a woven textile, a nonwoven textile (of tangled fibers), a foam with open cells, or a pierced or porous sheet. According to one embodiment, the substrate can be made of plastic (polyvinyl chloride (PVC), polyamide, polyurethane, polyether, polyester, polyethylene, thermoplastic polyurethane (TPU), elastomer such as ethylene-propylene-diene monomer (EPDM), polypropylene, etc.), of inorganic material (glass fibers, etc.) or a mixture of these materials.

According to one embodiment, the electrical conductor (for example a heating element) can be sewn onto the substrate. In particular, the electrical conductor can be attached on the substrate by a wire passing through the substrate. Such an attachment can at least partially perforate the substrate, which can generate portions without electrical insulation, and the insulating film, affixed after the seam (or after the attachment of the electrical conductor on the substrate), is free of perforations and/or through-holes.

According to one embodiment, the film comprising a polymer may be a continuous film, free of pores. According to one embodiment, the film comprising a polymer may be a film impermeable to water, and/or a film of plastic material, and/or a composite film comprising a layer of plastic material, and/or a composite film comprising a layer made of a material impermeable to water.

According to one embodiment, the film comprising a polymer may have a resistance to hydrostatic pressure of at least 5000 mm of water, preferably of at least 10,000 mm of water, preferably of at least 15,000 mm of water, and very preferentially of at least 20,000 mm of water. It is possible to institute a test based on the ISO811 standard, which consists of applying to the film a water column of increasingly large height. The test stops when water passes through the film.

According to one embodiment, the trim piece can be a flexible piece, such as a trim sheath. In particular, the trim piece can be a flexible piece, such as synthetic or natural leather. The trim piece can be made of fabric, non-woven, carbon, Kevlar, wood, with or without resin.

According to one embodiment, the film comprising a polymer may have a thickness of less than 200 μm, preferentially between 10 μm and 100 μm, ideally between 10 μm and 50 μm. The film comprising a polymer may be provided sufficiently supple and/or flexible to adapt to the complex shapes of the rim, in order to be able to be deposited or sheathed on the rim without forming folds visible to the user of the vehicle steering wheel.

According to one embodiment, the film comprising a polymer may be formed of polyethylene (PE), or of polyurethane (PU), or of ethylene-propylene-diene monomer (EPDM), or of poly(vinyl chloride) (PVC), or of thermoplastic polyurethane (TPU). The film comprising a polymer may be provided sufficiently supple and/or flexible to adapt to the complex shapes of the rim, in order to be able to be deposited or sheathed on the rim without forming folds visible to the user of the vehicle steering wheel.

According to one embodiment, the film comprising a polymer may comprise polyethylene PE, and/or polyurethane PU, and/or ethylene-propylene-diene monomer EPDM monomer, and/or polyvinyl chloride PVC, and/or thermoplastic polyurethane TPU. The film comprising a polymer may be provided sufficiently supple and/or flexible to adapt to the complex shapes of the rim, in order to be able to be deposited or sheathed on the rim without forming folds visible to the user of the vehicle steering wheel.

According to one embodiment, the film comprising a polymer may have a density comprised within a range of values from 1.10 g/cm$^3$ to 1.30 g/cm$^3$. The film comprising a polymer may be provided sufficiently supple and/or flexible to adapt to the complex shapes of the rim, in order to be able to be deposited or sheathed on the rim without forming folds visible to the user of the vehicle steering wheel.

According to one embodiment, the film comprising a polymer and the electrical device may form a stratified structure, preferably before the electrical device is assembled on the steering wheel. In other words, the insulating film and the electrical device may form a single component to be deposited on the rim.

According to one embodiment, the film comprising a polymer and the electrical device may form a stratified structure, preferably before the electrical device is assembled on the steering wheel. In particular, the insulating film and the electrical device can form a single component to be applied to an outer sheath, made of leather for example, to provide a single component to be applied to the rim in a single operation.

According to one embodiment, the electrical device is a stratified structure wherein the film comprising a polymer and/or the electrical conductor is attached by an adhesive, such as a double-sided adhesive film, in particular water-based.

According to one embodiment, the film comprising a polymer or the electrical conductor can be attached to the electrical device by an adhesive, such as a double-sided, in particular water-based, adhesive film. The assembly can be robust.

According to one embodiment, the film comprising a polymer can be arranged between the core and the electrical device. The structure can remain simple and does not require other intermediate components to avoid malfunctions (short-circuits or measurement disturbances).

According to one embodiment, the film comprising a polymer can be arranged between the electrical device and the trim piece. The structure can remain simple and does not require other intermediate components to avoid malfunctions (short-circuits or measurement disturbances).

According to one embodiment, the rim can comprise a second film comprising a polymer, and wherein the electrical device can be arranged between the two insulating films.

According to one embodiment, the electrical device may form a heating device and/or a device for detecting contact or proximity of a user with the steering wheel.

According to one embodiment, the substrate of the electrical device may be a foam, with a density comprised in a range of values ranging from 0.10 g/cm$^3$ to 0.80 g/cm$^3$. Such a substrate may be provided to be sufficiently supple and/or flexible to adapt to the complex shapes of the rim, in order to be able to be deposited or sheathed on the rim without forming folds visible to the user.

According to one embodiment, the substrate of the electrical device may be formed of polyethylene (PE), or of polyurethane (PU), or of ethylene-propylene-diene monomer (EPDM), or of poly(vinyl chloride) (PVC). Such a substrate may be provided to be sufficiently supple and/or flexible to adapt to the complex shapes of the rim, in order to be able to be deposited or sheathed on the rim without forming folds visible to the user.

According to one embodiment, the substrate of the electrical device may comprise polyethylene PE, and/or polyurethane PU, and/or ethylene-propylene-diene monomer EPDM monomer, and/or polyvinyl chloride PVC. Such a substrate may be provided to be sufficiently supple and/or flexible to adapt to the complex shapes of the rim, in order to be able to be deposited or sheathed on the rim without forming folds visible to the user.

According to one embodiment, the substrate of the electrical device may have a thickness greater than 500 μm. Such a substrate may be provided to be sufficiently supple and/or flexible to adapt to the complex shapes of the rim, in order to be able to be deposited or sheathed on the rim without forming folds visible to the user.

According to one embodiment, the substrate of the electrical device may be formed by an open-cell foam, or by a woven or non-woven piece. Such a substrate may be provided to be sufficiently supple and/or flexible to adapt to the complex shapes of the rim, in order to be able to be deposited or sheathed on the rim without forming folds visible to the user. In this case, the invention is particularly useful, because without the film comprising a polymer, the substrate can absorb a significant amount of liquid.

A second aspect of the invention relates to a vehicle comprising a vehicle steering wheel according to the first aspect.

According to one embodiment, the steering wheel may comprise a second overmolding material at least partially overmolded on the electrical device.

According to one embodiment, the film comprising a polymer can be a barrier film, in particular a moisture barrier film According to one embodiment, the film comprising a polymer can be a flexible film so that it can be deposited or sheathed on the rim without forming folds visible to the user of the vehicle steering wheel.

According to one embodiment, the film comprising a polymer may be a continuous film, free of pores. According to one embodiment, the film comprising a polymer may be a film impermeable to water, and/or a film of plastic material, and/or a composite film comprising a layer of plastic material, and/or a composite film comprising a layer made of a material impermeable to water.

According to one embodiment, the film comprising a polymer can cover between 75 and 100% of the surface of the substrate supporting the electrical conductor.

According to one embodiment, the film comprising a polymer can be arranged opposite the entire part of the substrate that supports the electrical conductor.

According to one embodiment, the film comprising a polymer can be arranged entirely between the layer of water-based glue and the electrical device.

According to one embodiment, the film comprising a polymer can completely cover the layer of water-based glue.

According to one embodiment, the electrical device can be a sheath covering at least part of the core.

According to one embodiment, the electrical conductor can be provided without an insulating sheath.

According to one embodiment, the core may comprise a frame portion and an overmolding material overmolded onto at least part of the frame portion.

Another aspect of the invention relates to a method of manufacturing a steering wheel, comprising the steps of:

- providing a steering wheel frame comprising a hub, a rim and at least one branch connecting the hub to the rim,
- attaching, to the steering wheel, at least one electrical device covering at least part of a core of the rim and comprising a substrate supporting at least one electrical conductor, the electrical device being provided with a film comprising a polymer on at least part of the electrical device,
- covering or coating at least part of the film with a water-based glue,
- glueing at least one trim piece to the steering wheel using water-based glue. Water-based glue can be applied to, spread on the trim piece instead of or in addition to the film. The film can be applied to the electrical device only once the electrical device has been attached to the steering wheel.

According to the above embodiment, the polymer film prevents the water-based glue from migrating to the electrical device. As a result, the water contained in the water-based glue cannot interfere with the operation of the electrical device, even if the water-based glue has not finished drying or curing. The electrical device can be switched on immediately after completion of the above procedure, and even during application of the liquid or pasty water-based glue.

Water-based glue can be applied by brush, roller, spatula or spray: the polymer film acts as an electrically insulating barrier.

In any case, the polymer film is provided over the entire surface of the electrical device that is to receive the water-based glue. In other words, the polymer film is provided opposite the entire part of the trim piece to be bonded, with no part of the electrical device (substrate or electrical conductor) receiving water-based glue.

DESCRIPTION OF THE FIGURES

Other features and advantages of the present invention will become more apparent upon reading the following detailed description of an embodiment of the invention, which is provided by way of example but in no manner limited thereto, and shown by the attached drawings, in which:

FIG. 1 shows a front view of a vehicle steering wheel;

FIG. 2 depicts a cross-section view of a rim of the vehicle steering wheel of FIG. 1;

FIG. 3 depicts another cross-section view of the rim of the vehicle steering wheel of FIG. 1;

FIG. 4 shows a schematic view of an electrical device of the rim of the vehicle steering wheel of FIG. 1.

DETAILED DESCRIPTION OF EMBODIMENT(S)

FIG. 1 shows a vehicle steering wheel with a rim 10, a hub 30 and branches 20 connecting the rim 10 to the hub 30. The rim 10 provides a manipulation interface to a user who can grip it by hand to drive the vehicle. To improve comfort and/or propose driving assistance options, the rim 10 may be equipped with one or more electrical devices (device for heating and/or detecting contact or proximity with the user).

To perform these functions, the electrical device can be placed under the external surface of the rim 10. As shown in the schematic section of FIG. 2, along the straight line II-II of FIG. 1, the rim 10 in particular comprises:

- a frame 11,
- an overmolding material 12,
- an electrical device 14,
- a trim piece or an outer sheath 15.

The frame 11 is typically a metal part forming a framework of the vehicle steering wheel. It is possible to provide an injected metal part, for example magnesium. The overmolding material 12 makes it possible to line the framework 11, and may be a plastic, a polymer, a foam, a polyurethane foam, for example. The frame 11 and the overmolding material 12 thus form a core N of the rim 10.

The electrical device 14 is schematically shown in FIG. 4 and can comprise a substrate 141 (a flexible sheet, such as a plastic material, a polymer, a foam, an open-cell foam, for example, a woven or non-woven material, etc.) whereupon an electrical conductor 142 can be provided, or a plurality of electrical conductors (one or more metal wire(s), a deposition of a conductive material, a fabric or a conductive nonwoven textile, etc.). FIG. 4 shows a film 13 comprising a polymer whose function will be explained below.

Finally, the outer sheath 15 forms a trim piece and covers the whole to provide an attractive appearance. It is possible to provide a sheath made of natural or synthetic leather or any other covering material. The outer sheath 15 can be sewn with a seam 16.

The outer sheath 15 can be attached to the rim 10 using glue, in particular water-based glue. For example, a water-based polyurethane glue may be used. Initially, the glue may contain, for example, at least 40% water by mass, or at least 50% water by mass.

FIG. 2 shows a cross-section of the rim 10 along the straight line II-II of FIG. 1, and FIG. 3 shows another section of the rim 10 along the straight line III-III of FIG. 1. FIG. 3 shows the same elements as FIG. 2, but as shown in FIG. 3, the frame 11 can have a different shape, and can be located closer to the surface of the overmolding material 12.

As regards the electrical device 14, provision may be made for the electrical conductor 142 of the electrical device 14 to be able to be at least partly on the surface of the substrate 141 and facing the core N of the rim 10 or facing the outer sheath 15. In the context of FIG. 3, the proximity of the frame 11 can pose a problem and cause a short-circuit or a disruption of the operation in the frame, for example of a contact or proximity sensor (typically capacitive).

Moreover, the glue used to attach the outer sheath 15 (or any other trim piece) to the rim contains water. The glue is applied in layers to the surfaces of the parts to be fastened together. Typically, one or both surfaces can be glued together, and then brought into contact to bond the part in question (outer sheath 15, electrical device 14, etc.) to the rim 10. The glue may migrate or disperse into adjacent materials, and/or water may contact the electrical conductor 142 and/or the substrate 141 of the electrical device 14. As a result, on the one hand the bonding capacity can be reduced if glue migrates or is absorbed by the materials of the pieces to be bonded together, and on the other hand water can cause electrical faults in the electrical device 14.

In order to prevent any risk, a film 13 comprising a polymer is provided between the electrical device 14 and the layer of water-based glue applied to the rim 10 and/or to the piece to be attached (the outer sheath 15, the electrical device 14, etc.), that is, the film 13 comprising a polymer is provided between the electrical device 14 and the overmolding material 12 on the one hand and/or the outer sheath 15 on the other, depending on the location of the layer of water-based glue. Thus, a barrier impermeable to water is provided by the film 13 comprising a polymer, and/or a minimum distance (the thickness of the film 13 comprising a polymer) is maintained between the electrical device 14 and the overmolding material 12 and/or the frame 11.

In detail, the film 13 comprising a polymer can be provided to be flexible and deformable to adapt to the complex shapes of the steering wheel. To this end, provision may be made to form the film 13 comprising a polymer from polyethylene (PE), or from polyurethane (PU), or from ethylene-propylene-diene monomer (EPDM), or from poly (vinyl chloride) (PVC), or from thermoplastic polyurethane (TPU). Thermoplastic polyurethane (TPU) may be preferred. The film 13 comprising a polymer may have a thickness of less than 200 μm, preferentially between 10 μm and 100 μm, ideally between 10 μm and 50 μm. The film comprising a polymer may have a density comprised within a range of values from 1.10 g/cm$^3$ to 1.30 g/cm$^3$ To assemble the steering wheel, two methods can be provided with regard to the sheathing of the rim 10. In a single sheathing method, the electrical device 14 and the outer sheath 15 are assembled together beforehand and then placed in a single step on the rim 10. In a double sheathing method, the electrical device 14 and the outer sheath 15 are assembled successively in two steps on the rim 10

For simple sheathing, the electrical device 14 is attached to the outer sheath 15 using a double-sided adhesive film (double-sided scotch tape), particularly water-based, to create a one-piece subassembly. The film 13 comprising a polymer is next or previously attached onto the electrical device 14 by an adhesive element of any nature (a thin layer of adhesive material used on the adhesive tapes and previously deposited on one of the components in question, or a double-sided adhesive tape (double-sided scotch tape)), in particular water-based, which can be deposited manually or in an automated manner, or a glue spread on either the film 13 comprising a polymer or the electrical device 14, etc.) to obtain a laminate to be deposited directly on the core N of the rim 10. Note that the film 13 comprising a polymer forms the lower or inner surface of this laminate.

Water-based glue can then be spread over the core N and/or the film 13 containing a polymer to bond the laminate (polymer-containing film 13-electrical device 14-outer sheath 15) to the rim 10, and the optional seam 16 can be sewn. According to this configuration, the film 13 comprising a polymer and the electrical device 14 are deposited in a single operation with the outer sheath 15 on the core N of the rim 10, in any case with the film 13 comprising a polymer interposed between the layer of water-based glue and the electrical device 14.

In the double sheathing method, the film 13 comprising a polymer can be previously attached onto the electrical device 14 by an adhesive element of any nature (a thin layer of adhesive material used on the adhesive tapes and previously deposited on one of the components in question, or a double-sided adhesive tape (double-sided scotch tape), in particular water-based, which can be deposited manually or in an automated manner, or a glue spread on either the film 13 comprising a polymer or the electrical device 14, etc.) to obtain a laminate to be deposited directly on the core N of the rim 10.

The electrical device 14 can be attached to the core N of the rim with an adhesive element of any kind (a thin layer of adhesive material used on the adhesive tapes and previously applied to one of the components in question, or a double-sided adhesive tape (double-sided scotch tape)), in particular water-based, which can be applied manually or using an automated method.

Water-based glue can then be spread over the film 13 comprising a polymer and/or the outer sheath 15 to bond the outer sheath 15) to the rim 10, and the optional seam 16 can be sewn.

INDUSTRIAL APPLICATION

A vehicle steering wheel according to the present invention, and its manufacture, are capable of industrial application.

It will be understood that various modifications and/or improvements which are obvious to a person skilled in the art may be made to the different embodiments of the invention described in the present description without departing from the scope of the invention.

The invention claimed is:

1. A vehicle steering wheel, comprising:

a hub arranged to be connected to a steering element of the vehicle, at least one branch attached to the hub, a rim attached to said at least one branch, comprising:

at least one electrical device covering at least part of a core of the rim and comprising a substrate supporting at least one electrical conductor, at least one trim piece defining an outer surface of the rim, at least one layer of water-based glue arranged to attach the trim piece to the rim, wherein the at least one layer of water-based glue is formed from a water-based glue applied in paste or liquid form, is a stand-alone component, and is not part of a double-sided adhesive tape, wherein the rim comprises at least one film comprising a polymer, arranged between the electrical device and the at least one layer of water-based glue, wherein the at least one film is configured to prevent or limit migration of liquid from the at least one layer of water-based glue toward the electrical device.

2. The vehicle steering wheel according to claim 1, wherein the film comprising a polymer has a thickness of less than 200 μm.

3. The vehicle steering wheel according to claim 1, wherein the film comprising a polymer comprises polyethylene (PE), polyurethane (PU), polymer of ethylene-propylene-diene monomer (EPDM), poly(vinyl chloride) (PVC), or thermoplastic polyurethane (TPU).

4. The vehicle steering wheel according to claim 1, wherein the film comprising a polymer has a density within a range of values from 1.10 $g/cm^3$ to 1.30 $g/cm^3$.

5. The vehicle steering wheel according to claim 1, wherein the film comprising a polymer and the electrical device form a laminated structure.

6. The vehicle steering wheel according to claim 1, wherein the electrical device is a laminated structure, and wherein the film comprising a polymer and the electrical conductor are attached by an adhesive.

7. The vehicle steering wheel according to claim 1, wherein a second film comprising a polymer is arranged between the core and the electrical device.

8. The vehicle steering wheel according to claim 1, wherein the film comprising a polymer is arranged between the electrical device and the trim piece.

9. The vehicle steering wheel according to claim 1, wherein the rim comprises a second film comprising a polymer, and wherein the electrical device is arranged between the at least one film and the second film.

10. The vehicle steering wheel according to claim 1, wherein the electrical device forms a heating device or a device for detecting contact or proximity of a user with the steering wheel.

11. The vehicle steering wheel according to claim 1, wherein the substrate of the electrical device is a foam, with a density within a range of values from 0.10 $g/cm^3$ to 0.80 $g/cm^3$.

12. The vehicle steering wheel according to claim 1, wherein the substrate of the electrical device comprises polyethylene (PE), polyurethane (PU), polymer of ethylene-propylene-diene monomer (EPDM), or poly(vinyl chloride) (PVC).

13. The vehicle steering wheel according to claim 1, wherein the substrate of the electrical device has a thickness greater than 500 μm.

14. The vehicle steering wheel according to claim 1, wherein the substrate of the electrical device is made of an open-cell foam, or of a woven or non-woven piece.

15. A vehicle comprising a vehicle steering wheel according to claim 1.

* * * * *